(12) United States Patent
Aizawa

(10) Patent No.: US 7,739,443 B2
(45) Date of Patent: Jun. 15, 2010

(54) MEMORY CONTROLLER, MEMORY DEVICE AND CONTROL METHOD FOR THE MEMORY CONTROLLER

(75) Inventor: Hideo Aizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 11/230,600

(22) Filed: Sep. 21, 2005

(65) Prior Publication Data

US 2006/0064538 A1    Mar. 23, 2006

(30) Foreign Application Priority Data

Sep. 22, 2004   (JP) .............................. 2004-275651

(51) Int. Cl.
*G06F 12/00* (2006.01)
(52) U.S. Cl. .................. 711/103; 711/115; 711/118; 711/165; 711/E12.016; 711/E12.083
(58) Field of Classification Search ........................ None
See application file for complete search history.

(56) References Cited

U.S. PATENT DOCUMENTS 6,564,286 B2 *   5/2003   DaCosta ..................... 711/103
7,266,664 B2 *   9/2007   Higuchi et al. ............. 711/173

FOREIGN PATENT DOCUMENTS

JP       5-151094       6/1993
WO    WO 9713204 A1 *  4/1997

OTHER PUBLICATIONS

Microsoft Computer Dictionary, 2002, Microsoft Press, Fifth Edition, p. 215.*

* cited by examiner

*Primary Examiner*—Reginald G Bragdon
*Assistant Examiner*—Shawn X Gu
(74) *Attorney, Agent, or Firm*—Oblon, Spivak, McClelland, Maier & Neustadt, L.L.P.

(57) ABSTRACT

The present invention provides a memory controller which includes a host interface connected to a host apparatus and receives a first data write-in unit of reception data, a memory interface connected to nonvolatile semiconductor memory in which is written a second data write-in unit of data larger than the first data write-in unit of data, and transmits the first data write-in unit of write-in data, and a central processing unit, which writes the reception data in a temporary write-in block of the nonvolatile semiconductor memory via the memory interface, reads out from the temporary write-in block the write-in data corresponding to area data when a total amount of reception data received by the host interface has reached amount of the second data write-in unit of the area data, and writes the area data including the read-out write-in data in a target block different from the temporary write-in block.

23 Claims, 10 Drawing Sheets

| TARGET AREA | TEMPORARY AREA |
|---|---|
| a4 | b0 |
| a5 | b5 |
| a6 | b10 |
| ⋮ | ⋮ |
| ⋮ | ⋮ |

MEMORY CONTROLLER, MEMORY DEVICE AND CONTROL METHOD FOR THE MEMORY CONTROLLER

CROSS REFERENCE TO RELATED APPLICATIONS AND INCORPORATION BY REFERENCE

This application is based upon and claims the benefit of priority from prior Japanese Patent Application P2004-275651 filed on Sep. 22, 2004; the entire contents of which are incorporated by reference herein.

BACKGROUND OF THE INVENTION

1. Field of the Invention

The present invention relates to a memory controller and a control method for the same. More specifically, it relates to a memory card or a memory device in which a nonvolatile semiconductor memory, such as NAND flash memory, is embedded.

2. Description of the Related Art

In the case of writing data in a memory component, such as a flash memory, the amount of data to be written at one time may be fixed. In addition, with a higher level apparatus, such as a computer with a file system, a unit of write-in data is determined separately from the memory component. The write-in unit of data for the memory component may be larger than that for a higher level apparatus (apparatus employing a memory card: host) such as a write-in unit of 2048 bytes for the memory component and a write-in unit of 512 bytes for the higher level apparatus.

The memory device, such as a memory card, is embedded with a memory component that writes in such large units of data and responds to a write-in instruction from the higher level apparatus. The memory device must also be capable of processing write-in of a small unit of data.

When the allowable unit of data write-in for the higher level apparatus is small (e.g., 512 bytes) and that for the nonvolatile memory component is large (e.g., 2048 bytes), after writing small unit data D1 in the nonvolatile memory component from the higher level apparatus, small unit data D2 may be written in an area subsequent to the page in which the data D1 is written. There may be a flash memory that does not allow division of a page to write in data. In this case, that flash memory must copy data other than the data D1, from the block including the data D1, into another block and write the data D1 and D2 in that other block. Such processing is hereafter referred to as 'sacrificed moving' for convenience sake. When this 'sacrificed moving' occurs frequently, as it accompanies an operation of copying un-rewritable data, write-in performance of the memory device is impaired. Therefore, there is a problem that writing in a flash memory typically used as the nonvolatile memory component takes a long time.

Note that a high-speed write-in method of temporally storing write-in data from a host in a nonvolatile memory and processing the write-in data under control of a memory controller, and then writing the data back in a cache memory, when booting an apparatus after processing, has been interrupted due to power failure or the like is disclosed in Japanese Laid-open Patent Application No. Hei 5-151094.

SUMMARY OF THE INVENTION

An aspect of the present invention inheres in a memory controller which includes a host interface configured to be connected to a host apparatus and to receive a first data write-in unit of reception data from the host apparatus; a memory interface configured to be connected to a nonvolatile semiconductor memory in which is written a second data write-in unit of data larger than the first data write-in unit of data. A central processing unit is configured to write the reception data as the write-in data in a temporary write-in block of the nonvolatile semiconductor memory via the memory interface, read out write-in data corresponding to area data from the temporary write-in block when a total amount of reception data received by the host interface has reached an amount of the second data write-in unit of the area data, and write the area data including the read-out, write-in data in a target block different from the temporary write-in block.

Another aspect of the present invention inheres in a memory controller which includes a host interface configured to be connected to a host apparatus and receive a first data write-in unit of reception data from the host apparatus; a memory interface configured to be connected to a nonvolatile semiconductor memory in which is written a second data write-in unit of data larger than the first data write-in unit of data; and a random access nonvolatile cache memory configured to store the first data write-in unit of reception data. A central processing unit is configured to: write the reception data as the write-in data in the nonvolatile cache memory via the host interface, read out write-in data corresponding to area data from the nonvolatile cache memory when a total amount of reception data received by the host interface has reached an amount of the second data write-in unit of the area data, and write the area data including the read-out, write-in data in a target block in the nonvolatile semiconductor memory via the memory interface.

Another aspect of the present invention inheres in a memory device, connected to a host apparatus for transmitting a first write-in data unit of transmit data, which includes a nonvolatile semiconductor memory including a target block and a memory management information block, and in which is written a second data write-in unit of data larger than the first data write-in unit of data. A memory controller includes a host interface configured to be connected to a host apparatus and receives a first data write-in unit of reception data. A memory interface is configured to be connected to the nonvolatile semiconductor memory in which is written a second data write-in unit of data larger than the first data write-in unit of data. A central processing unit is configured to: write the reception data in a temporary write-in block of the nonvolatile semiconductor memory via the memory interface, read out from the temporary write-in block the write-in data corresponding to area data when a total amount of reception data received by the host interface has reached an amount of the second data write-in unit of the area data, and write the area data including the read-out, write-in data in a target block different from the temporary write-in block.

Another aspect of the present invention inheres in a control method for a memory controller. The method includes receiving a reception data having a first data write-in unit from a host apparatus via a host interface; transmitting, via a memory interface, write-in data to a nonvolatile semiconductor memory in which is written a second data write-in unit of data larger than the first data write-in unit of data; writing the reception data as the write-in data in a temporary write-in block in the nonvolatile semiconductor memory, via the memory interface; reading out, from the temporary write-in block, write-in data corresponding to area data when a total amount of reception data received by the host interface has reached an amount of the second data write-in unit of the area data; and writing the area data including the read-out, write-in data in a target block different from the temporary write-in block in the nonvolatile semiconductor memory.

DETAILED DESCRIPTION OF THE INVENTION

Figure 1:
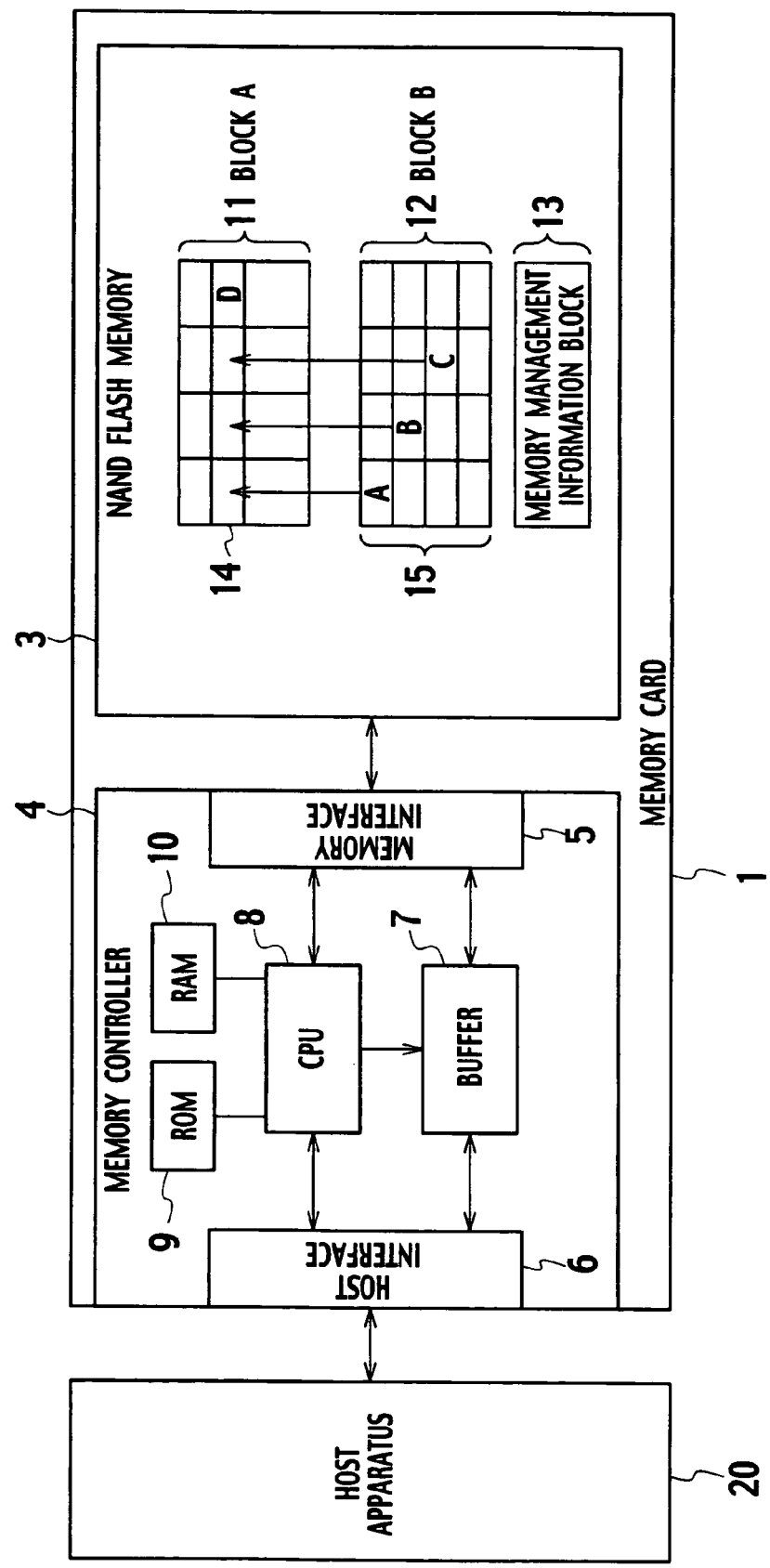
FIG. 1 is a block diagram schematically showing a memory controller, according to a first embodiment of the present invention, and an entire structure of a memory card including the memory controller and a NAND flash memory.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Referring to the drawings, embodiments of the present invention are described below. The embodiments shown below exemplify an apparatus and a method that are used to implement the technical ideas according to the present invention, and do not limit the technical ideas according to the present invention to those that appear below. These technical ideas, according to the present invention, may receive a variety of modifications that fall within the claims.

A first through a third embodiment of the present invention are described forthwith while referencing the drawings. The same or similar symbols are applied to the same or similar parts throughout the appended drawings. In addition, the first and the second embodiment given forthwith illustrate devices and methods for embodying the technical ideas of the present invention, and those technical ideas are not limited to the following materials, shapes, structures, arrangements or the like. The technical ideas of the present invention may be modified into various modifications within the scope of the appended claims.

According to a memory controller in a memory device, such as a memory card, according to the first through the third embodiment of the present invention, and a control method for the same, in response to an instruction from a higher level apparatus to write in a small unit of data, data is temporarily written in an area of a nonvolatile memory or nonvolatile cache memory provided in the memory controller, instead of directly writing the data in an address of the nonvolatile memory, which is a target address in which data is finally written. Afterwards, when the total amount of data stored in the nonvolatile memory has reached an amount of a predetermined write-in data unit of data, upon transmission of a contiguous address write-in instruction from the higher level apparatus, the data temporarily written in the area of the nonvolatile memory or the nonvolatile cache memory in the memory controller is written in the target area of the nonvolatile memory. This processing reduces 'sacrificed moving', and improves write-in performance of the memory device.

The present invention provides a memory controller, a control method for the same, and a memory device for a memory card or a memory device having an improved write-in performance, even in the case where a higher level apparatus writes in small units of data. The memory card or the memory device is embedded in a nonvolatile semiconductor memory such as NAND flash memory in which large units of data are written.

First Embodiment

The memory controller according to the first embodiment of the present invention, as shown in FIG. 1, comprises a host interface (I/F) 6 connected to a host apparatus 20. The host interface receives a first data write-in unit of reception data from the host apparatus 20. A memory interface (I/F) 5 is connected to a NAND flash memory 3 in which is written a second unit of data, larger than the first unit of data, and transmits the first data write-in unit of write-in data to the NAND flash memory 3. A central processing unit (CPU) 8 writes the reception data as write-in data in a temporary write-in block of the NAND flash memory 3 via the memory interface 5. The CPU 8 reads out from the temporary write-in block (block B) 12 the write-in data corresponding to area data when a total amount of reception data received by the host interface 6 has reached an amount of data corresponding to the second data write-in unit of the area data, and writes the area data including the read-out write-in data in a target block (block A) 11 different from the temporary write-in block (block B) 12. The CPU 8 determines an address for write-in data by reading out memory management information from a memory management block 13 of the NAND flash memory 3. Alternatively, as described later, page address information in the temporary write-in block (block B) 12 and page address information of a write-in destination in the target block (block A) 11 may be stored in a predetermined area of the NAND flash memory 3.

(Memory Device)

An exemplary application of the memory controller 4, as applied to a memory card is shown in FIG. 1. FIG. 1 is a block diagram showing a structure including the host apparatus 20 and the memory card 1. The host apparatus 20 comprises hardware and software (system) for accessing the memory card 1 connected thereto.

The memory card 1 is energized when connected to the host apparatus 20, and carries out processing in response to each access from the host apparatus 20. The memory card 1 comprises the memory controller 4 according to the first embodiment of the present invention.

An exemplary structure of a memory device in which the memory controller 4 is applied to a memory device, such as the memory card 1 is connected to the host apparatus 20 for transmitting the first data write-in unit of transmit data. The memory device comprises the temporary write-in block (block B) 12 and the target block (block A) 11, different from the temporary write-in block (block B) 12. The memory device includes the memory controller 4. The memory controller 4 comprises the nonvolatile semiconductor memory, such as the NAND flash memory 3; the host interface (I/F) 6, connected to the host apparatus 20. The host interface 6 receives the first data write-in unit of reception data. The memory controller 4 also includes the memory interface (I/F) 5 connected to the NAND flash memory 3. The memory interface 5 transmits the first data write-in unit of write-in data in the NAND flash memory 3. A central processing unit 8 writes the reception data as write-in data in the temporary write-in block (block B) 12 of the NAND flash memory 3, via the memory interface 5, reads out from the temporary write-in block (block B) 12 the write-in data corresponding to area data when a total amount of reception data received by the host interface 6 has reached an amount of the second data write-in unit of the area data, and writes the area data including the read-out write-in data in the target block (block A) 11. The block 11 is different from the temporary write-in block (block B) 12.

The NAND flash memory 3 is a nonvolatile memory having, for example, an erase block size (block size of an erase unit of data) of 256 bytes for an erasing operation. The NAND flash memory 3 is fabricated using 90 nm process technology, for example. In other words, a design rule for the NAND flash memory 3 is less than 100 nm. Furthermore, storage capacity of the NAND flash memory is preferably 1 G byte (GB) or more, so as to provide a technically effective memory card 1.

(Memory Controller)

The memory controller according to the first embodiment of the present invention includes the memory interface 5, the host interface 6, buffer memory 7, and RAM 10 in addition to the CPU 8 and ROM 9 mounted thereupon. The memory controller 4 manages the internal physical state of the NAND flash memory 3 (i.e., information that data stored in which logic sector address is in which physical block address, or which block has been erased.)

The memory I/F 5 carries out interface processing between the memory controller 4 and the NAND flash memory 3. The memory I/F 6 carries out interface processing between the memory controller 4 and the host apparatus 20.

The buffer memory 7 temporarily stores a given amount of data (e.g., equivalent to one page worth) when writing into the NAND flash memory 3 data that is sent from the host apparatus 20, and temporarily stores a given amount of data when transmitting data read out from the NAND flash memory 3 to the host apparatus 20.

The CPU 8 controls overall operations of the memory card 1. For example, when the memory card 1 receives an electrical power supply, the CPU 8 executes predetermined processing in conformity with firmware, such as a control program stored in the ROM 9. The CPU generates various tables in the RAM 10, receive a write-in command, a read-out command, or an erase command from the host apparatus 20 and accesses a NAND memory cell of the NAND flash memory 3, and control data processing via the buffer memory 7.

The ROM 9 is a memory storing a control program or the like used by the CPU 8.

The ROM 10 is a memory used as a working area by the CPU 8 and stores various tables.

(NAND Flash Memory)

The structure of the NAND flash memory 3 comprises the temporary write-in block (block B) 12 configured to temporarily store contiguous write-in data via the memory interface 5, and the target block (block A) 11 configured to store area data, page by page, from the temporary write-in block (block B) 12, and the memory management information block 13 configured to store memory management information. Reference numerals 14 and 15 denote empty pages.

Figure 2:
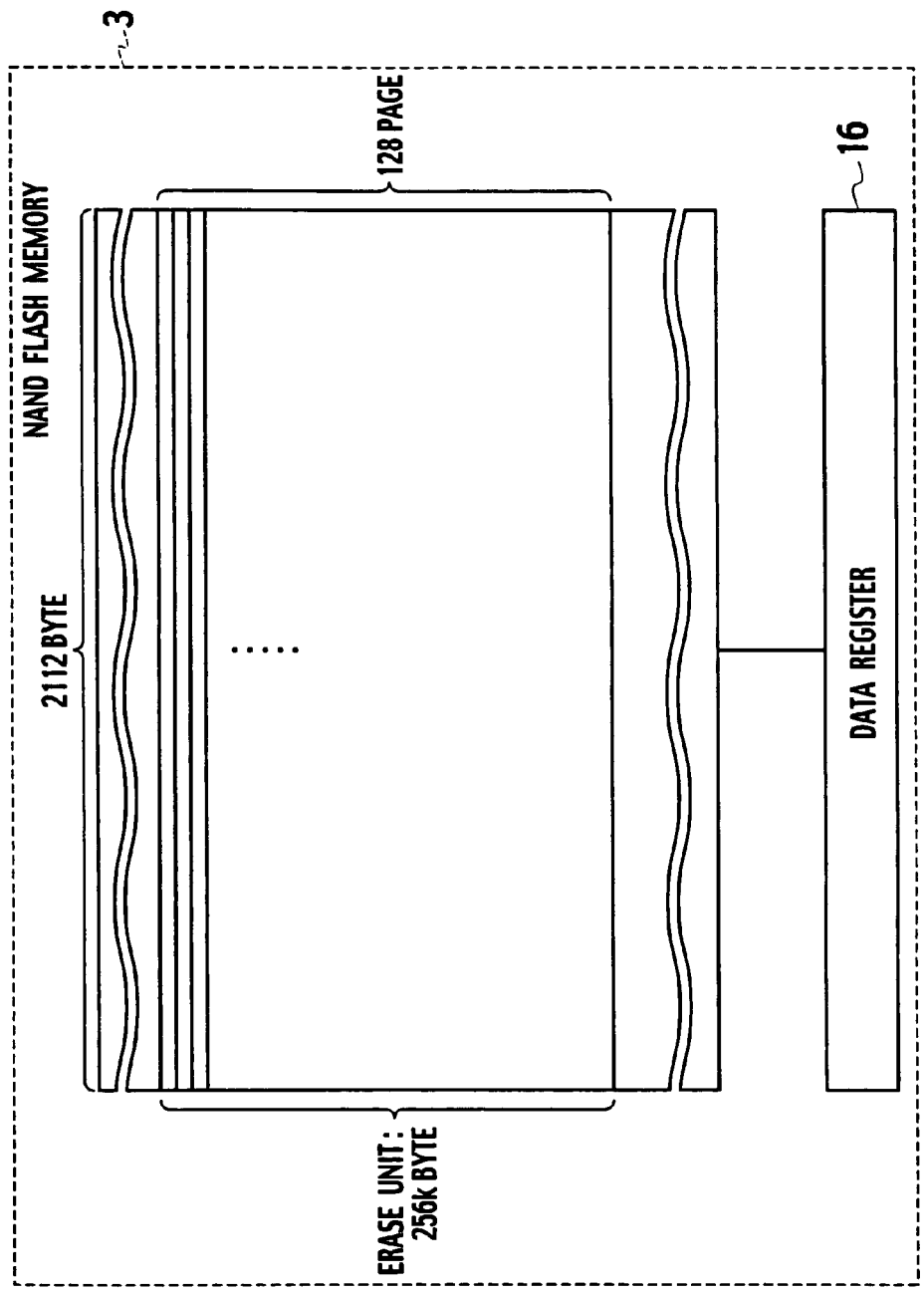
FIG. 2 shows an exemplary structure of the NAND flash memory.

FIG. 2 shows an arrangement of data in a flash memory (i.e., the NAND flash memory 3 in the memory card 1). Each page in the flash memory 3 has 2112 bytes (i.e., four 512-byte data areas plus four 10-byte redundant areas plus a 24-byte management data area), and 128 pages makes up an erase unit (i.e., 256 KB plus 8 KB). Note that the erase unit of the flash memory is set to 256 KB in the following description. The NAND flash memory 3 comprises a data register 16 for inputting/outputting data to/from the flash memory. At the time of data write-in or the like, data transmission between the data register 16 and the flash memory is carried out in units of pages equivalent to the storage capacity of the data register 16. The storage capacity of the data register 16 is 2112 bytes (2048 bytes plus 64 bytes). The storage capacity of the data register 16 corresponds to the data write-in unit (the second data write-in unit) for the flash memory. In contrast to the data write-in unit for the NAND flash memory 3, the data write-in unit (the first data write-in unit) for the host apparatus 20 is 512 bytes. In other words, a single page of the NAND flash memory 3 stores data that correspond to the size of four data write-in units for the host apparatus 20.

Furthermore, as shown in detail in FIGS. 3 through 6, the structure of the NAND flash memory 3, according to the first embodiment of the present invention, comprises the target block (block A) 11, which includes pages p0, p1, p2, . . . respectively divided into four write-in unit areas (first data write-in units) 21 for the host apparatus, and the temporary write-in block (block B) 12, which similarly includes pages q0, q1, q2, . . . respectively divided into four write-in unit areas 21. The target block (block A) 11 and the temporary write-in block (block B) 12 may be formed by dividing the data area of the same NAND flash memory 3. Needless to say, separately structured NAND flash memory may be used instead of using the same NAND flash memory 3. For example, the 2048-byte data constituting a page described using FIG. 2 may be divided into four areas each making up a write-in data unit of 512 bytes.

Figures 3, 4:
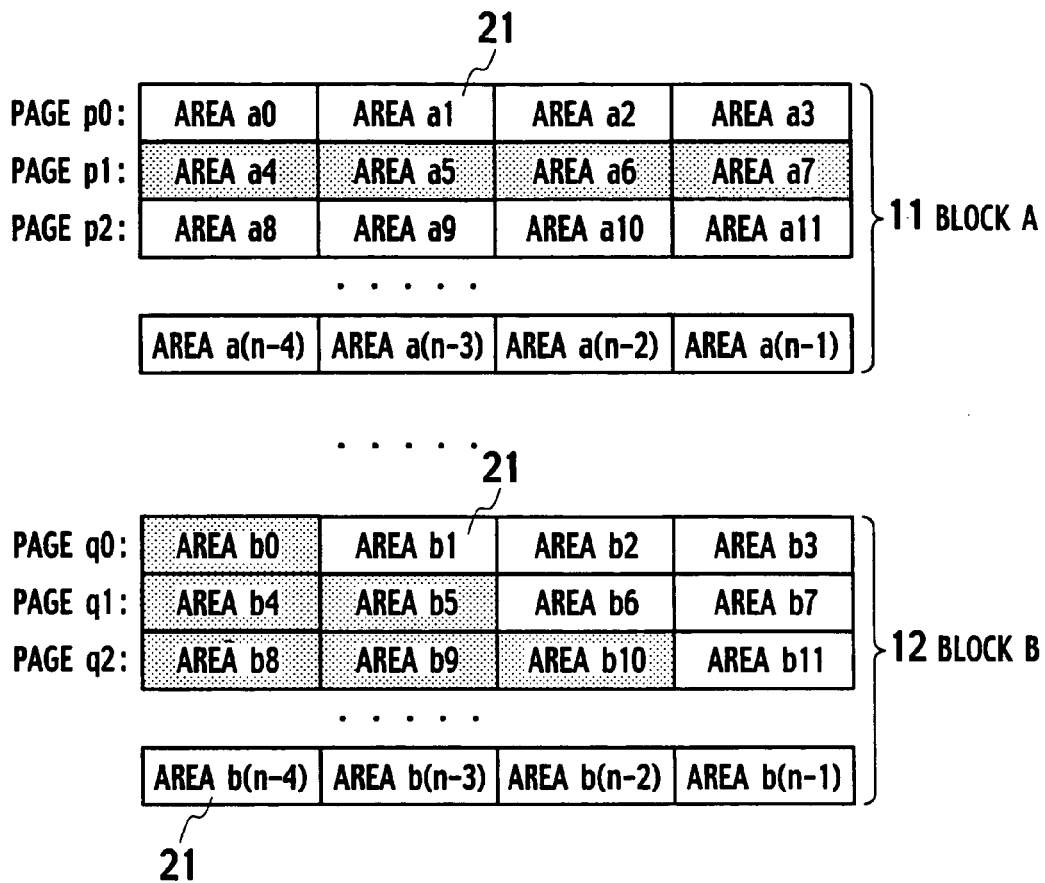
FIG. 3 is a diagram showing a data structure of nonvolatile memory (NAND flash memory), and describing an exemplary operation of the memory controller, according to the first embodiment of the present invention.
FIG. 4 shows an exemplary structure of a memory management table.

Correspondence between a target area in the target block (block A) 11 and a temporary area in the temporary write-in block (block B) 12 is described in a memory management table, as shown in FIG. 4. The management table of FIG. 4 incorporates a memory management information block 13, which stores memory management information, shown in FIG. 1. However, a management table as shown in FIG. 4 is not essential. Alternatively, page information may be stored in a predetermined area of the NAND flash memory 3, as described later in a first exemplary operation.

Here, while the NAND flash memory 3 has been exemplified as a nonvolatile semiconductor memory, other forms of nonvolatile semiconductor memory, such as NOR, AND, two transistor-cell, and three transistor-cell types may naturally be employed. Furthermore, the nonvolatile semiconductor memory is not limited to binary storage, and may naturally employ a method of storing data on a multi-value logic basis, such as four-value data.

(Control Method for Memory Controller)

A control method for the memory controller 4 according to the first embodiment of the present invention, as shown in FIG. 1, comprises the steps of receiving the first data write-in unit of reception data from the host apparatus 20 by the host interface 6, transmitting the first data write-in unit of write-in data to a nonvolatile semiconductor memory, such as the NAND flash memory 3, that stores second data write-in unit of data that is larger than the first data write-in unit of data by the memory interface 5. A further step includes writing the reception data, as write-in data, to the temporary write-in block (block B) 12 of the NAND flash memory 3 via the memory interface 5, reading out from the temporary write-in block (block B) 12 the write-in data corresponding to area data when a total amount of reception data received by the host interface 6 has reached an amount of the second data write-in unit of the area data. Then, writing the area data including the read-out, write-in data in the target block (block A) 11 that is different from the temporary write-in block (block B) 12.

(First Exemplary Operation)

Figure 5:
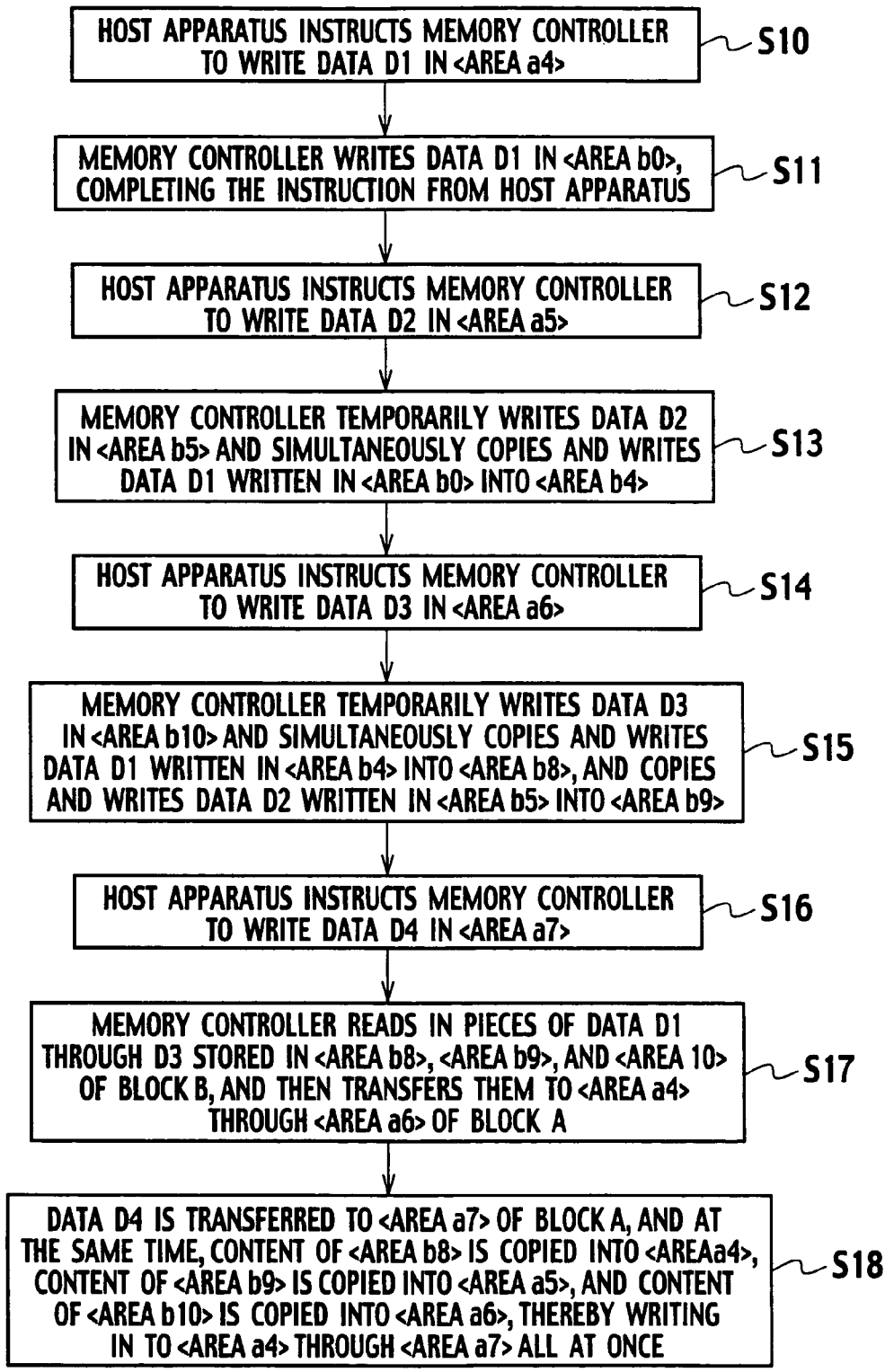
FIG. 5 is a flowchart showing a first exemplary control operation of the memory controller, according to the first embodiment of the present invention.

An exemplary operation of when the host apparatus 20, which is a higher level apparatus, sends the following instructions to the memory card 1, embedded with the memory controller 4, is described while referencing FIGS. 3 and 5.

First, in step S10, the host apparatus 20 instructs the memory controller 4 to write data D1 in an <area a4> of the target block (block A) 11.

In step S11, the memory controller 4 then writes the data D1 in an <area b0> of the temporary write-in block (block B) 12, completing the instruction from the host apparatus 20.

Next, in step S12, the host apparatus 20 instructs the memory controller 4 to write data D2 in an <area a5>.

In step S13, the memory controller 4 temporarily writes the data D2 in <area b5> of the temporary write-in block (block B) 12. At the same time, the memory controller 4 copies and writes the data D1 written in the <area b0> of the temporary write-in block (block B) 12 into an <area b4>.

Similarly, in step S14, the host apparatus 20 instructs the memory controller 4 to write data D2 in an <area a6>.

In step S15, the memory controller 4 temporarily writes the data D3 in an <area b10> of the temporary write-in block (block B) 12. At the same time, the memory controller 4 copies and writes the data D1 written in the <area b4> of the temporary write-in block (block B) 12 into an <area b8>, and copies and writes the data D2, written in the <area b5>, into an <area b9>.

Next, in step S16, the host apparatus 20 instructs the memory controller 4 to write data D4 in an <area a7>.

In step S17, the memory controller 4 retrieves the data D1 through D3 from the respective <area b8>, <area b9>, and <area b10> of the temporary write-in block (block B) 12 and then transmits data D1-D3 to the <area a4> through <area a6> of the target block (block A) 11.

Next, in step S18, at the same time the data D4 is transmitted to an <area a7> of the target block (block A) 11, the content of the <area b8> is copied into the <area a4>, the content of the <area b9> is copied into the <area a5>, and the content of the <area b10> is copied into the <area a6>, thereby implementing write-in to the <area a4> through <area a7>, all at one time.

In other words, a write-in operation is generally carried out collectively. Since data is not written just by being copied, a collective write-in operation accomplishes writing in of data.

In the first exemplary operation, page address information indicating which page in the temporary write-in block (block B) 12 is the newest page, and page address information indicating a write-in destination of the target block (block A) 11, in which data stored in that newest page is written, may be stored in a predetermined area in the NAND flash memory 3. This is because, for example, in the case of a power source turning off due to sudden removal of the memory card 1 from the host apparatus 20 and then being turned on again, reading out data from a page in a predetermined storage area of the NAND flash memory 3 allows efficient and prompt rebooting.

(Second Exemplary Operation)

Figure 6:
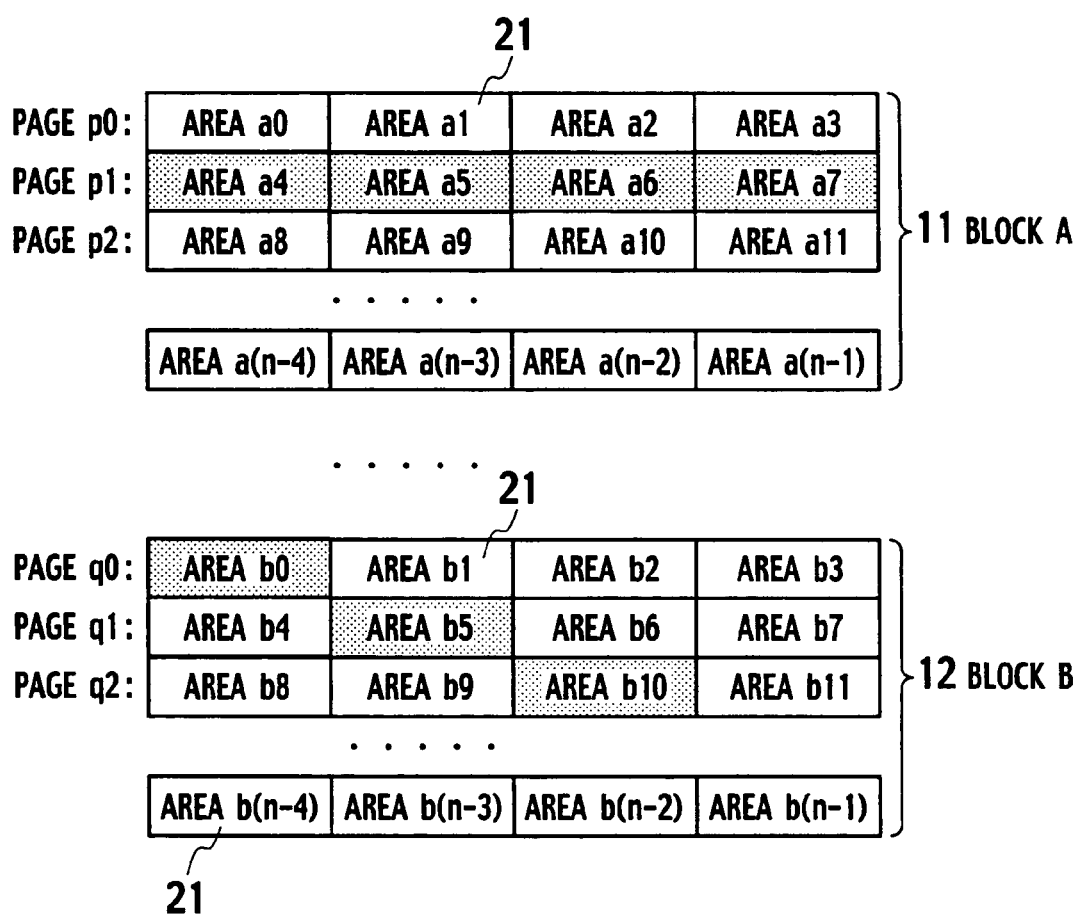
FIG. 6 is a diagram showing a data structure of nonvolatile memory (NAND flash memory), and describing an exemplary operation of the memory controller, according to the first embodiment of the present invention.
Figure 7:
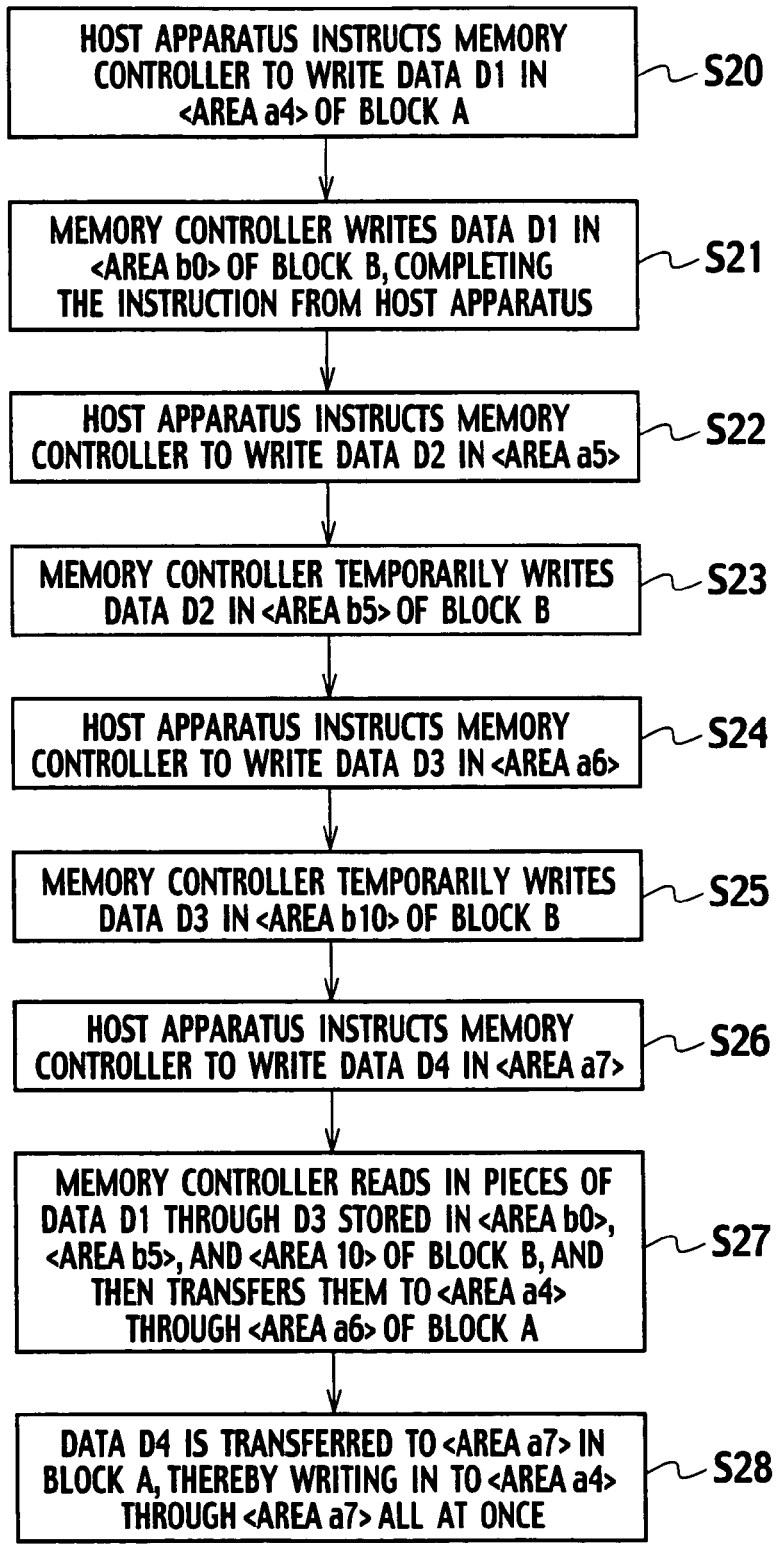
FIG. 7 is a flowchart showing a second exemplary control operation of the memory controller, according to the first embodiment of the present invention.

An exemplary operation of when the host apparatus 20, which is a higher level apparatus, sends the following instructions to the memory card 1, embedded in the memory controller 4, is described while referencing FIGS. 6 and 7.

First, in step S20, the host apparatus 20 instructs the memory controller 4 to write data D1 in an <area a4> of the target block (block A) 11.

In step S21, the memory controller 4 then writes the data D1 in an <area b0> of the temporary write-in block (block B) 12, completing the instruction from the host apparatus 20.

Next, in step S22, the host apparatus 20 instructs the memory controller 4 to write data D2 in an <area a5>.

In step S23, the memory controller 4 temporarily writes the data D2 in an <area b5> of the temporary write-in block (block B) 12.

Similarly, in step S24, the host apparatus 20 instructs the memory controller 4 to write data D3 in an <area a6>.

In step S25, the memory controller 4 temporarily writes the data D3 in an <area b10> of the temporary write-in block (block B) 12.

Next, in step S26, the host apparatus 20 instructs the memory controller 4 to write data D4 in an <area a7>.

In step S27, the memory controller 4 retrieves the data D1 through D3 from the <area b0>, <area b5>, and <area b10> of the temporary write-in block (block B) 12 and then transmits data D1-D3 to the <area a4> through <area a6> of the target block (block A) 11.

In step S28, the data D4 is then transferred to the <area a7> of the target block (block A) 11, thereby implementing write-in to the <area a4> through <area a7> all at once.

In the second exemplary operation, prohibiting partial write-in of a page prevents a program disturb from occurring. In other words, the reason why the data D2 is written in the <area b5> instead of an <area b1> is because write-in is carried out for the <area b0> in a  before processing of the data D2. This prohibition of write-in from being carried out twice for the <area b1> in the same  prevents a program disturb. The same holds true for the data D3. In other words, the data D3 is written in the <area b10> instead of the <area b6> because write-in is carried out for the <area b5> in the  before processing of the data D3. Thus, write-in is prohibited from being carried out twice for the <area b6> in the same  so as to prevent a program disturb. The reason why the write-in data is written in a nonvolatile memory such as the NAND flash memory 3, instead of temporarily written in a volatile memory, such as a RAM, is because the data D1 may be deciphered even when a power source of the memory card 1 is turned off and then turned on once the host apparatus 20 has written the data D1. Furthermore, this operation is performed because when the host apparatus 20 instructs the memory card 1 to retrieve the data D2 from the <area a5> in this state, the memory controller 4 can return the data D2 of the <area b5> to the host apparatus 20.

According to the above-described control method for the memory controller, when the host apparatus 20 provides a write-in instruction to write a small unit of data or the first data write-in unit in contiguous addresses, the data can be efficiently written in a nonvolatile memory component such as the NAND flash memory 3, capable of storing large units of data or the second data write-in unit of data without sacrificed moving.

The first embodiment of the present invention, which includes a memory card or a memory device embedded with a nonvolatile semiconductor memory, such as a NAND flash memory, capable of storing large units of data, provides a memory controller, a memory device, and a control method for the memory controller, which may improve write-in performance, even for small write-in units of data, from a higher level apparatus.

Second Embodiment

Figure 8:
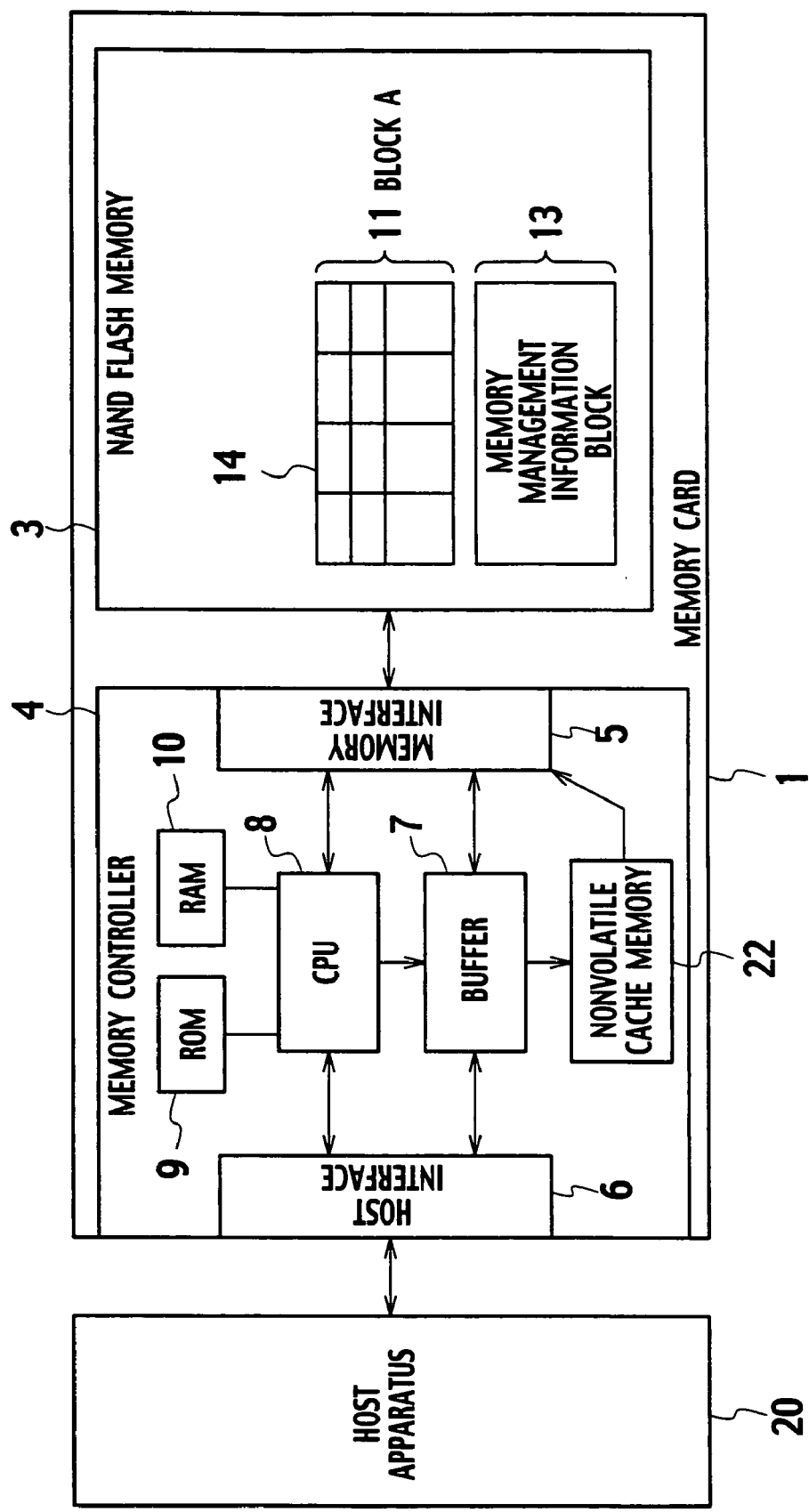
FIG. 8 is a block diagram schematically showing a memory controller, according to a second embodiment of the present invention, and an entire structure of a memory card including the memory controller and a NAND flash memory.

A memory controller 4 according to the second embodiment of the present invention, as shown in FIG. 8, comprises a host interface 6, which is connected to a host apparatus 20. The host interface 6 receives a first data write-in unit of reception data from the host apparatus 20, random access nonvolatile cache memory 22, which stores the first data write-in unit of reception data. A memory interface 5 is connected to a NAND flash memory 3 that stores a second data write-in unit of data larger than the first data write-in unit of data. A central processing unit (CPU) 8 writes the reception data as write-in data to the nonvolatile cache memory 22 via the host interface 6, reads out from the nonvolatile cache memory 22 the write-in data corresponding to area data when a total amount of reception data received by the host interface 6 has reached an amount of the second data write-in unit of the area data, and writes the area data including the read-out write-in data in a target block (block A) 11 of the NAND flash memory 3 via the memory interface 5.

Figure 9A:
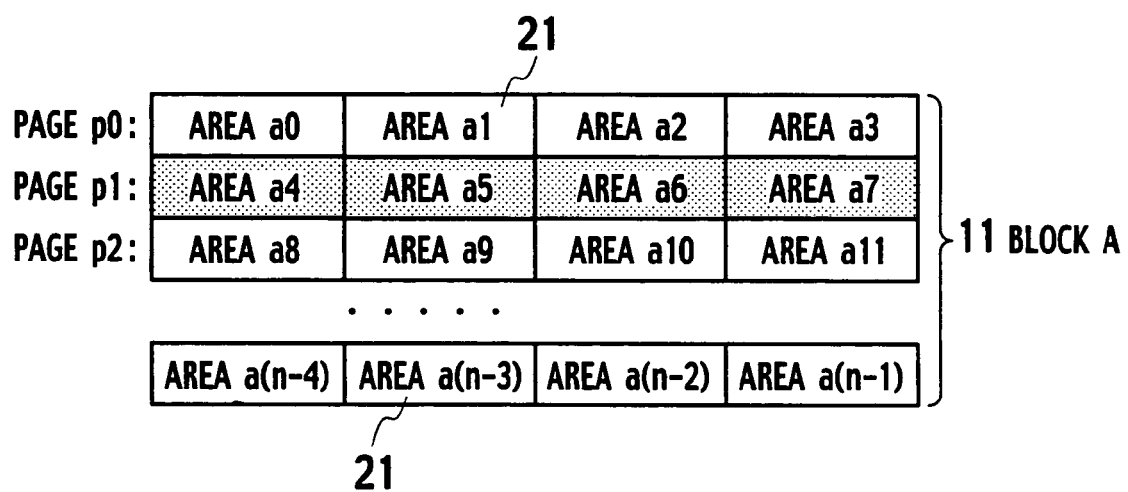
FIG. 9A is a diagram showing a data structure of a NAND flash memory, and describing an exemplary operation of the memory controller, according to the second embodiment of the present invention.
Figure 9B:
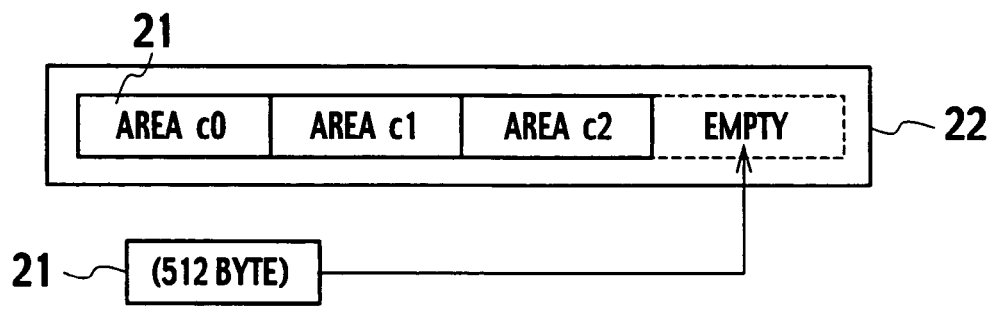
FIG. 9B is a diagram showing a data structure of nonvolatile cache memory in the memory controller, according to the second embodiment of the present invention, and describing an exemplary operation of the memory controller.

FIG. 8 is a schematic block diagram of the memory controller according to the second embodiment of the present invention showing an entire structure of a memory card 1 including the NAND flash memory 3. FIG. 9A shows a data structure of the NAND flash memory 3 of FIG. 8, and FIG. 9B shows a data structure of nonvolatile cache memory 22 in the memory controller 4 of FIG. 8.

The memory controller 4 has the nonvolatile cache memory 22 embedded therein. The nonvolatile cache memory 22 is connected to buffer memory 7 and the memory I/F 5. The nonvolatile cache memory 22 comprises a random access nonvolatile memory, such as a ferroelectric random access memory (FeRAM), magnetic random access memory (MRAM) or the like.

As shown in FIG. 8, the NAND flash memory 3 is different from the example shown in FIG. 1, and does not need the temporary write-in block (block B) 12. This is because the same operation of the temporary write-in block (block B) 12 is implemented by the nonvolatile cache memory 22 provided in the memory controller 4.

(Memory Device)

An exemplary application of the memory controller 4, according to the second embodiment of the present invention, to a memory card is shown in FIG. 8. FIG. 8 is a block diagram showing a structure including the host apparatus 20 and the memory card 1. The host apparatus 20 comprises hardware and software (system) for accessing the memory card 1 connected thereto.

The memory card 1 receives electric power to operate when connected to the host apparatus 20, and carries out processing in response to each access from the host apparatus 20. The memory card 1 comprises the memory controller 4, according to the second embodiment of the present invention.

FIG. 8 shows an exemplary structure of a memory device, such as the memory card 1, including the memory controller 4 according to the second embodiment of the present invention and is connected to the host apparatus 20 for transmitting the first data write-in unit of transmit data. The memory card 1 comprises a nonvolatile semiconductor memory, such as the NAND flash memory 3, having the target block (block A) 11 and stores a second data write-in unit of data larger than the first data write-in unit of data. The memory controller 4 includes the host interface 6 connected to the host apparatus 20 that receives the first data write-in unit of reception data therefrom; the random access nonvolatile cache memory 22 storing the first data write-in unit of reception data; the memory interface 5, connected to the NAND flash memory 3, and storing the second data write-in unit of data larger than the first data write-in unit of data; and a central processing unit 8. The central processing unit 8 writes the reception data as write-in data to the nonvolatile cache memory 22 via the host interface 6, reads out from the nonvolatile cache memory 22 the write-in data corresponding to area data when a total amount of reception data received by the host interface 6 has reached an amount of the second data write-in unit of the area data, and writes the area data including the read-out, write-in data in the target block (block A) 11 of the NAND flash memory 3 via the memory interface 5.

(Control Method for Memory Controller)

A control method for the memory controller 4 according to the second embodiment of the present invention, as shown in FIG. 8, comprises the steps of receiving the first data write-in unit of reception data from the host apparatus 20 by the host interface 6, transmitting via the memory interface 5 write-in data to a nonvolatile semiconductor memory, such as the NAND flash memory 3, storing the second data write-in unit of data larger than the first data write-in unit of data, writing the reception data as write-in data to the nonvolatile cache memory 22 of the memory controller 4 via the host interface 6, reading out, from the nonvolatile cache memory 22, the write-in data corresponding to area data when a total amount of reception data received by the host interface 6 have reached an amount of the second data write-in unit of the area data, and writing the area data including the read-out, write-in data in the target block (block A) 11 of the NAND flash memory 3 via the memory interface 5.

(Third Exemplary Operation)

Figure 10:
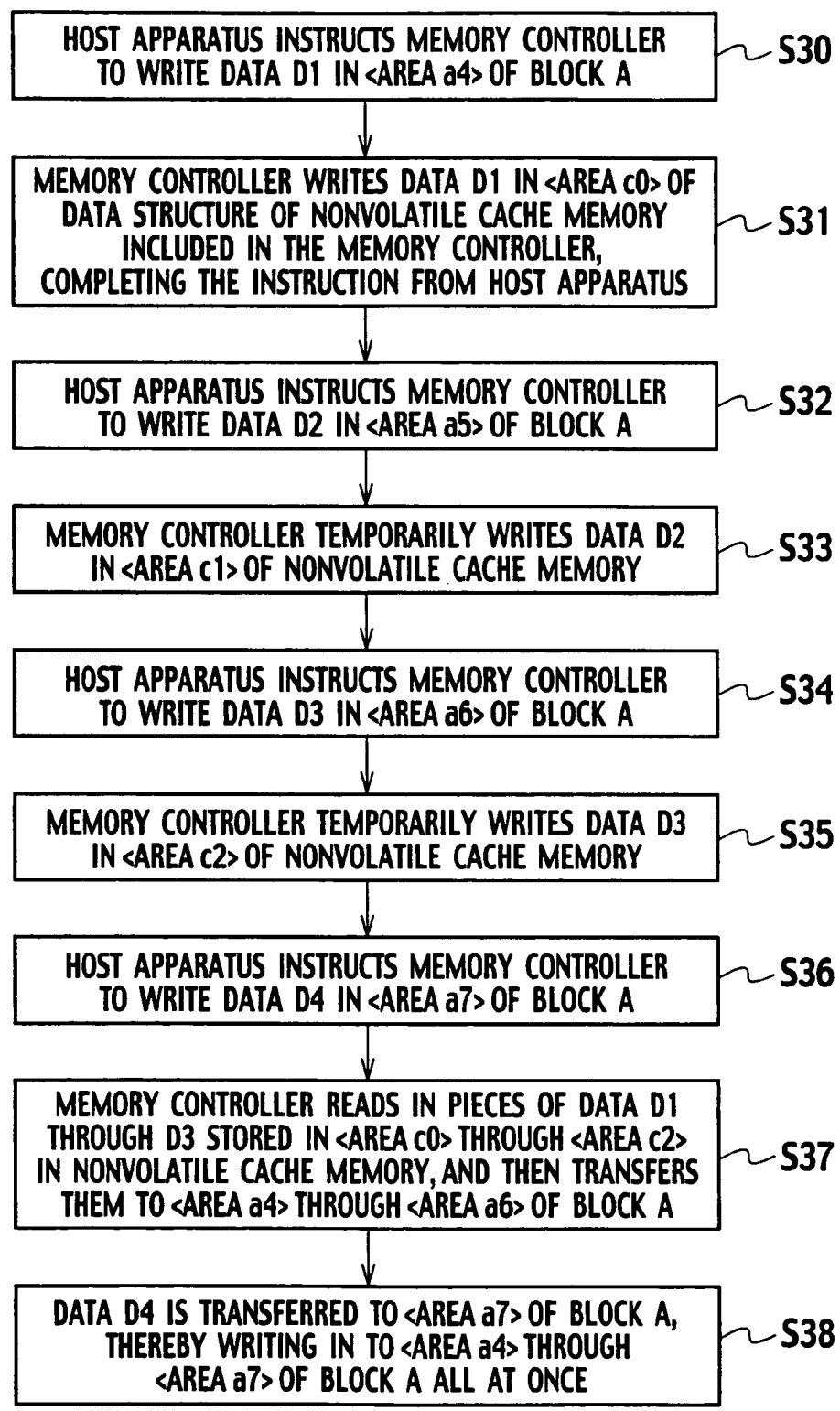
FIG. 10 is a flowchart showing a third exemplary control operation of the memory controller, according to the second embodiment of the present invention.

An exemplary operation of when the host apparatus 20, which is a higher level apparatus, sends the following instructions to the memory card 1 including the memory controller 4, is described while referencing FIGS. 9 and 10.

First, in step S30, as shown in FIG. 9A, the host apparatus 20 instructs the memory controller 4 to write data D1 in an <area a4> of the target block (block A) 11.

In step S31, as shown in FIG. 9B, the memory controller 4 then writes the data D1 in an <area c0> of the data structure of the nonvolatile cache memory 22 of the memory controller 4, completing the instruction from the host apparatus 20.

Next, in step S32, the host apparatus 20 instructs the memory controller 4 to write data D2 in an <area a4> of the target block (block A) 11.

In step S33, the memory controller 4 temporarily writes the data D2 in an <area c1> of the nonvolatile cache memory 22.

Similarly, in step S34, the host apparatus 20 instructs the memory controller 4 to write data D3 in an <area a6> of the target block (block A) 11.

In step S35, the memory controller 4 temporarily writes the data D3 in an <area c2> of the nonvolatile cache memory 22.

Next, in step S36, the host apparatus 20 instructs the memory controller 4 to write data D4 in an <area a7> of the target block (block A) 11.

In step S37, the memory controller 4 retrieves the data D1 through D3 from the respective <area c0> through <area c2> in the nonvolatile cache memory 22 and then transmits data D1-D3 to the <area a4> through <area a6> of the target block (block A) 11.

In step S38, the data D4 is then transferred to the <area a7> of the target block (block A) 11, thereby writing data D4 in the <area a4> through <area a7> of the target block (block A) 11 all at one time.

In the exemplary operations given above, page address information indicating which page in the nonvolatile cache memory 22 is the newest page, and page address information of a write-in destination indicating to which address of the target block (block A) 11 data stored in that newest page is written, may be stored in a predetermined area of the NAND flash memory 3 or the nonvolatile cache memory 22. This is because, for example, in the case of a power source turning off due to sudden removal of the memory card 1 from the host apparatus 20 and then being turned on again, reading out data from a page in a predetermined storage area of the nonvolatile cache memory 22 facilitates rebooting thereof.

According to the above-described processing, in response to write-in instructions of writing small units of data or the first data write-in unit of data from the host apparatus 20, data may be efficiently written in a nonvolatile memory component, such as the NAND flash memory 3, which stores a large data write-in unit of data or the second data write-in unit of data, without sacrificed moving. Therefore, according to the second embodiment of the present invention, a memory controller, a memory device, and a control method for the memory controller that improves write-in performance may be provided.

Furthermore, according to the second embodiment of the present invention, compared to the first embodiment, temporarily saving data in the random access nonvolatile cache memory 22 prevents uncalled access to the nonvolatile memory component from occurring, and thereby improves write-in performance.

Third Embodiment

On/Off Operation for Divided Write-in Function

A memory device, such as the memory card 1 as shown in FIG. 1, including the memory controller 4, according to the first embodiment of the present invention, may include an additional function of turning on and off a divided write-in function of the memory controller 4. Similarly, a memory device such as the memory card 1 as shown in FIG. 8 including the memory controller 4, according to the second embodiment of the present invention, may also include an additional function of turning on and off a divided write-in function of the memory controller 4.

A memory controller 4, according to the third embodiment of the present invention, includes an additional function of turning on and off a divided write-in function of the embedded memory controller 4.

Figure 11:
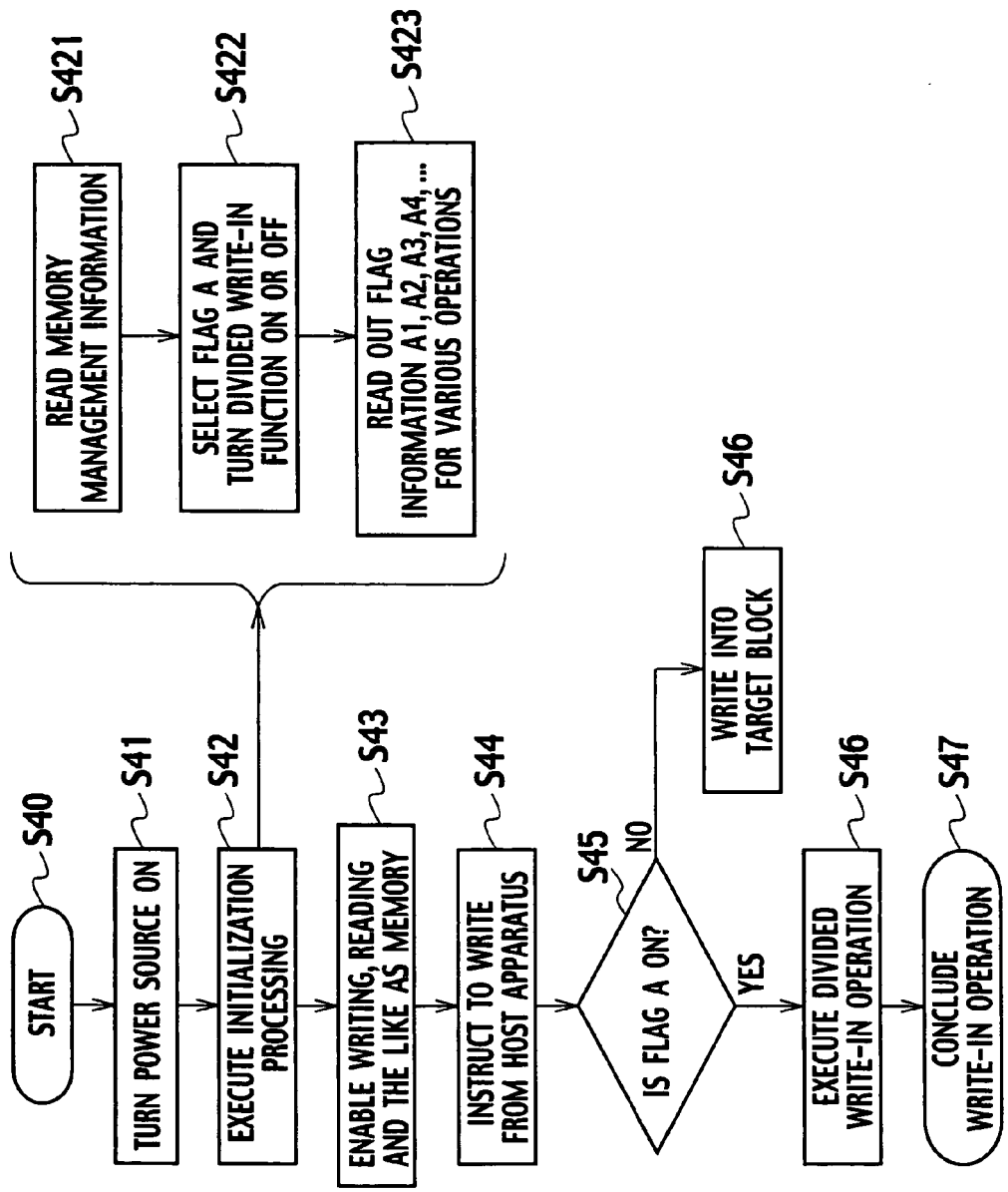
FIG. 11 is a flowchart describing an operation of a memory controller, according to a third embodiment of the present invention.

A flowchart describing the memory controller according to the third embodiment of the present invention, for turning a divided write-in function on and off, is as shown in FIG. 11.

Firstly, processing starts in step S40.

Next, a power source is turned ON in step S41.

Initialization processing is then executed in step S42.

More specifically, initialization processing includes step S421 in which memory management information is read out, step S422 in which flag information A is selected and in which a divided write-in operation is turned ON or OFF, and step S423 in which flag information A1, A2, A3, . . . of various operations and the like is read out.

After the initialization processing in step S42, writing, reading, or the like to/from the memory is enabled in step S43.

It is then determined, in step S45, whether or not a flag A is ON.

If NO in the step S45, processing proceeds to step S46 in which write-in to a target block is executed.

If YES in the step S45, processing proceeds to the step S46 in which divided write-in is executed.

Once processing in the step S46 is completed, processing proceeds to step S47 and the write-in operation is concluded.

The memory controller 4, according to the third embodiment of the present invention, may also be applied to a NAND flash memory storing binary data. The NAND flash memory storing binary data, when used in the memory card 1 shown in FIG. 1 or 8, is capable of divided write-in (write-in operation in units of 512 bytes). Writing units of 512 bytes to the NAND flash memory allows a higher speed operation of the memory device than an operation of avoiding a divided write-in on the memory controller 4 side.

Accordingly, in the case of NAND flash memory 3 storing binary data that does not require the divided write-in function, turning the divided write-in function off improves performance of the memory card 1. Therefore, the memory controller 4 according to the third embodiment of the present invention may accommodate a wide range of NAND flash memory capabilities by adding the on/off operation of the divided write-in function.

Setting of the on/off operation of the divided write-in function of the memory controller 4 depends on the memory management information stored on the NAND flash memory. At the time of initializing the memory controller 4 or the memory device, the CPU 8 retrieves the memory management information, and then by controlling the memory controller 4 in accordance with that read-in, setting value, turning the divided write-in function of the memory controller 4 on or off is carried out.

Adding the on/off operation of the divided write-in function to the embedded memory controller 4, according to the third embodiment of the present invention, makes it possible to accommodate a variety of NAND flash memory capabilities. Moreover, when the NAND flash memory is capable of being written in units of 512 byte, turning off the divided write-in function of the embedded memory controller 4 provides high-speed memory device operations.

Other Embodiments

As described above, the present invention is described according to the first through the third embodiment; however, it should not be perceived that descriptions and drawings forming a part of this disclosure are intended to limit the spirit and scope of the present invention. Various alternative embodiments, working examples, and operational techniques will become apparent from this disclosure for those skills in the art.

In this manner, the present invention naturally includes various embodiments not described herein. Accordingly, the technical range of the present invention should be determined only by the following claims that can be regarded appropriate from the above-mentioned descriptions.

Various modifications will become possible for those skilled in the art after receiving the teachings of the present disclosure without departing from the scope thereof.

What is claimed is:

1. A memory controller for controlling a nonvolatile semiconductor memory which writes data in a second data write-in unit and erases data in an erase unit including a plurality of second data write-in units, comprising:
   a host interface configured to be connectable to a host apparatus and to receive a first data write-in unit of reception data from the host apparatus;
   a memory interface configured to be connected to the nonvolatile semiconductor memory in which the second data write-in unit of data larger in size than the first data write-in unit of reception data is written; and
   a central processing unit configured to write the reception data via the memory interface as write-in data of the first data write-in unit in a temporary write-in block which is provided in the nonvolatile semiconductor memory, read out write-in data corresponding to a plurality of area data from the temporary write-in block when a total amount of reception data has reached an amount of the second data write-in unit, and write the plurality of area data including the, write-in data into a target block which is a different block from the temporary write-in block and provided in the nonvolatile semiconductor memory.

2. The memory controller of claim 1, wherein the memory interface transmits the first data write-in unit of reception data to the nonvolatile semiconductor memory.

3. The memory controller of claim 1, wherein the nonvolatile semiconductor memory is a NAND flash memory.

4. The memory controller of claim 3, wherein the NAND flash memory includes the temporary write-in block, the target block and a management block configured to store memory management information.

5. The memory controller of claim 4, wherein the central processing unit reads out the memory management information to determine an address for the write-in data.

6. The memory controller of claim 5, further comprising a buffer memory configured to temporarily store a specific quantity of data when writing data sent from the host apparatus to the NAND flash memory, and temporarily storing data read out from the NAND flash memory.

7. The memory controller of claim 1 further comprising a read only memory storing a control program used by the central processing unit, and a random access memory storing various tables and used as a working area by the central processing unit.

8. A memory controller for controlling a nonvolatile semiconductor memory which writes data in a second data write-in unit and erases data in an erase unit including a plurality of second data write-in units, comprising:
   a host interface configured to be connectable to a host apparatus and receive a first data write-in unit of reception data from the host apparatus;
   a memory interface configured to be connected to the nonvolatile semiconductor memory in which the second data write-in unit of data larger in size than the first data write-in unit of reception data is written;
   a random access nonvolatile cache memory configured to store the first data write-in unit of reception data from the host apparatus;
   a central processing unit configured to write the reception data via the host interface as write-in data of the first data write-in unit in the nonvolatile cache memory, read out write-in data corresponding to a plurality of area data from the nonvolatile cache memory when a total amount of reception data has reached an amount of the second data write-in unit, and write the plurality of area data including the write-in data into a target block which is provided in the nonvolatile semiconductor memory via the memory interface;
   a read only memory storing a control program used by the central processing unit; and
   a random access memory storing tables and used as a working area by the central processing unit.

9. The memory controller of claim 8, wherein the memory interface transmits the first data write-in unit of reception data to the nonvolatile semiconductor memory.

10. The memory controller of claim 8, wherein the nonvolatile semiconductor memory is a NAND flash memory.

11. The memory controller of claim 10, wherein the NAND flash memory includes the target block and a management block configured to store memory management information.

12. The memory controller of claim 11, wherein the central processing unit reads out the memory management information to determine an address for the write-in data.

13. A memory device, connectable to a host apparatus transmitting a first write-in data unit of reception data, comprising:
   a nonvolatile semiconductor memory which writes data in a second data write-in unit and erases data in an erase unit including a plurality of second data write-in units, the nonvolatile semiconductor memory comprising a target block and a memory management information block; and
   a memory controller for controlling the nonvolatile semiconductor memory comprising:
      a host interface configured to be connectable to the host apparatus and receive the first data write-in unit of reception data;
      a memory interface configured to be connected to the nonvolatile semiconductor memory in which the second data write-in unit of data larger in size than the first data write-in unit of reception data is written; and
      a central processing unit configured to write the reception data via the memory interface as write-in data of the first data write-in unit in a temporary write-in block which is provided in the nonvolatile semiconductor memory, read out write-in data corresponding to a plurality of area data from the temporary write-in block when a total amount of reception data has reached an amount of the second data write-in unit, and write the plurality of area data including the write-in data into the target block which is a different block from the temporary write-in block and provided in the nonvolatile semiconductor memory.

14. The memory device of claim 13, wherein the memory interface transmits the first data write-in unit of reception data to the nonvolatile semiconductor memory.

15. The memory device of claim 13, wherein the nonvolatile semiconductor memory is a NAND flash memory.

16. The memory device of claim 15, wherein the memory controller further comprises a buffer memory configured to temporarily store a specific quantity of data when writing data sent from the host apparatus to the NAND flash memory, and temporarily store data read out from the NAND flash memory.

17. The memory device of claim 13, wherein the memory controller further comprises a read only memory storing a control program used by the central processing unit, and a random access memory storing various tables and used as a working area by the central processing unit.

18. A control method for a memory controller for controlling a nonvolatile semiconductor memory which writes data in a second data write-in unit and erases data in an erase unit including a plurality of second data write-in units, comprising:
receiving a reception data of a first data write-in unit from a host apparatus via a host interface;
transmitting, via a memory interface, the reception data to the nonvolatile semiconductor memory in which the second data write-in unit of data larger in size than the first data write-in unit of reception data is written;
writing the reception data via the memory interface as write-in data of the first data write-in unit in a temporary write-in block which is provided in the nonvolatile semiconductor memory;
reading out write-in data corresponding to a plurality of area data from the temporary write-in block when a total amount of reception data has reached an amount of the second data write-in unit; and
writing the plurality of area data including the write-in data into a target block which is a different block from the temporary write-in block and provided in the nonvolatile semiconductor memory.

19. A control method for a memory controller for controlling a nonvolatile semiconductor memory which writes data in a second data write-in unit and erases data in an erase unit including a plurality of second data write-in units, comprising:
receiving a reception data of a first data write-in unit from a host apparatus via a host interface;
transmitting, via a memory interface, the reception data to the nonvolatile semiconductor memory in which the second data write-in unit of data larger in-size than the first data write-in unit of reception data is written;
writing the reception data via the host interface as the write-in data into a nonvolatile cache memory which is provided in the memory controller;
reading out, from the nonvolatile cache memory, write-in data corresponding to a plurality of area data from the nonvolatile cache memory when a total amount of reception data has reached an amount of the second data write-in unit; and
writing the plurality of area data including the write-in data into a target block which is provided in the nonvolatile semiconductor memory via the memory interface.

20. A memory device, connectable to a host apparatus transmitting a first write-in data unit of reception data, comprising:
a nonvolatile semiconductor memory, which writes data in a second data write-in unit and erases data in an erase unit including a plurality of second data write-in units, comprising a target block and a memory management information block, the second data write-in unit of data being larger in size than a first data write-in unit of reception data; and
a memory controller for controlling the nonvolatile semiconductor memory comprising:
a host interface configured to be connectable to the host apparatus and receive the first data write-in unit of reception data;
a memory interface configured to be connected to the nonvolatile semiconductor memory in which the second data write-in unit of data is written;
a random access nonvolatile cache memory configured to store the first data write-in unit of reception data;
a central processing unit configured to write the reception data via the host interface as write-in data of the first data write-in unit into the nonvolatile cache memory, read out write-in data corresponding to a plurality of area data from the nonvolatile cache memory when a total amount of reception data has reached an amount of the second data write-in unit, and write the plurality of area data including the write-in data into the target block which is provided in the nonvolatile semiconductor memory via the memory interface;
a read only memory storing a control program used by the central processing unit; and
a random access memory storing tables and used as a working area by the central processing unit.

21. The memory device of claim 20, wherein the memory interface transmits the first data write-in unit of reception data to the nonvolatile semiconductor memory.

22. The memory device of claim 20, wherein the nonvolatile semiconductor memory is a NAND flash memory.

23. The memory device of claim 22, wherein the memory controller further comprises a buffer memory configured to temporarily store a specific quantity of data when writing data sent from the host apparatus to the NAND flash memory, and temporarily store data read out from the NAND flash memory.

* * * * *